US010644873B2

(12) United States Patent
Wurcker et al.

(10) Patent No.: US 10,644,873 B2
(45) Date of Patent: May 5, 2020

(54) METHOD FOR PROTECTING SUBSTITUTION OPERATION AGAINST SIDE-CHANNEL ANALYSIS

(71) Applicant: ESHARD, Martillac (FR)

(72) Inventors: Antoine Wurcker, Villenave D'Ornon (FR); Christophe Clavier, Rilhac Lastours (FR)

(73) Assignee: ESHARD, Martillac (FR)

( * ) Notice: Subject to any disclaimer, the term of this patent is extended or adjusted under 35 U.S.C. 154(b) by 245 days.

(21) Appl. No.: 15/636,223

(22) Filed: Jun. 28, 2017

(65) Prior Publication Data

US 2017/0373830 A1 Dec. 28, 2017

(30) Foreign Application Priority Data

Jun. 28, 2016 (EP) ..................................... 16176716
Jun. 28, 2016 (EP) ..................................... 16176717
(Continued)

(51) Int. Cl.
*H04L 9/00* (2006.01)
*G09C 1/00* (2006.01)
(Continued)

(52) U.S. Cl.
CPC ................ *H04L 9/002* (2013.01); *G09C 1/00* (2013.01); *H04L 9/0631* (2013.01);
(Continued)

(58) Field of Classification Search
CPC ..... H04L 9/002; H04L 9/0631; H04L 9/0861; H04L 2209/04; H04L 2209/043; H04L 2209/08; H04L 2209/12
See application file for complete search history.

(56) References Cited

U.S. PATENT DOCUMENTS 6,182,266 B1 * 1/2001 Clutter .................... G06F 11/08
365/218
6,278,783 B1 8/2001 Kocher et al.
(Continued)

FOREIGN PATENT DOCUMENTS

EP 1267514 A2 12/2002
EP 1601132 A1 11/2005
(Continued)

OTHER PUBLICATIONS

Extended European Search Report from EP Appn. No. 16176714.0, dated Jan. 3, 2017, 6 pages.
(Continued)

*Primary Examiner* — Eric W Shepperd
(74) *Attorney, Agent, or Firm* — Brake Hughes Bellermann LLP

(57) ABSTRACT

A method for executing an operation by a circuit, may include using a first mask set of mask parameters including a same number of occurrences of all possible values of a word of an input data in relation to a size thereof, using an input set including for each mask parameter in the first mask set a data obtained by applying XOR operations to the input data and to the mask parameter and providing an output set including all data resulting from the application of the operation to a data in the input set. The output data may be obtained by applying XOR operations to any of the data in the output set and to a respective second mask parameter in a second mask set including a same number of occurrences of all possible values of the second mask parameters in relation to a size of thereof.

30 Claims, 9 Drawing Sheets

(30) Foreign Application Priority Data

| Jun. 28, 2016 | (EP) | 16176718 |
|---|---|---|
| Jun. 28, 2016 | (EP) | 16176719 |
| Jun. 28, 2016 | (EP) | 16176721 |

(51) Int. Cl.
*H04L 9/06* (2006.01)
*H04L 9/08* (2006.01)
*H04L 9/14* (2006.01)

(52) U.S. Cl.
CPC ............ *H04L 9/0861* (2013.01); *H04L 9/14* (2013.01); *H04L 2209/04* (2013.01); *H04L 2209/08* (2013.01); *H04L 2209/12* (2013.01)

(56) References Cited

U.S. PATENT DOCUMENTS

| 8,625,780 | B2 | 1/2014 | Peter et al. | |
|---|---|---|---|---|
| 10,243,729 | B2 | 3/2019 | Thiebeauld De La Crouee | |
| 2001/0053220 | A1 | 12/2001 | Kocher et al. | |
| 2004/0202317 | A1* | 10/2004 | Demjanenko | H04L 9/0631 380/28 |
| 2005/0259814 | A1* | 11/2005 | Gebotys | H04L 9/003 380/28 |
| 2006/0045264 | A1* | 3/2006 | Kocher | G06F 21/556 380/37 |
| 2006/0056622 | A1 | 3/2006 | Liardet et al. | |
| 2006/0256963 | A1* | 11/2006 | Gebotys | H04L 9/003 380/205 |
| 2007/0076890 | A1 | 4/2007 | Muresan et al. | |
| 2007/0160196 | A1 | 7/2007 | Timmermans | |
| 2008/0019503 | A1 | 1/2008 | Dupaquis et al. | |
| 2008/0240443 | A1 | 10/2008 | Vuillaume et al. | |
| 2009/0074181 | A1 | 3/2009 | Pelletier | |
| 2009/0086976 | A1* | 4/2009 | Scian | H04L 9/003 380/277 |
| 2012/0198211 | A1* | 8/2012 | Suzuki | G06F 1/3203 712/221 |
| 2012/0250854 | A1 | 10/2012 | Danger et al. | |
| 2013/0236005 | A1* | 9/2013 | Ikeda | H04L 9/003 380/28 |
| 2014/0101458 | A1* | 4/2014 | Farrugia | G06F 21/125 713/190 |
| 2014/0351603 | A1 | 11/2014 | Feix et al. | |
| 2015/0169904 | A1 | 6/2015 | Leiserson et al. | |
| 2015/0244524 | A1* | 8/2015 | Pulkus | H04L 9/003 380/28 |
| 2016/0127123 | A1* | 5/2016 | Johnson | H04L 9/003 713/189 |
| 2016/0269175 | A1 | 9/2016 | Cammarota et al. | |
| 2017/0063522 | A1* | 3/2017 | Bruneau | H04L 9/003 |
| 2017/0063524 | A1* | 3/2017 | Bruneau | H04L 9/005 |
| 2017/0104586 | A1 | 4/2017 | Hars | |
| 2017/0230171 | A1* | 8/2017 | Gadepally | H04L 9/0894 |
| 2017/0244552 | A1 | 8/2017 | Thiebeauld De La Crouee et al. | |
| 2017/0373829 | A1 | 12/2017 | Wurcker et al. | |
| 2017/0373832 | A1 | 12/2017 | Wurcker et al. | |
| 2017/0373838 | A1 | 12/2017 | Wurcker et al. | |
| 2018/0167196 | A1* | 6/2018 | Cooper | G06F 21/72 |

FOREIGN PATENT DOCUMENTS

| FR | 3048086 | A1 | 8/2017 |
|---|---|---|---|
| GB | 2443355 | A | 4/2008 |
| WO | 0108012 | A1 | 2/2001 |

OTHER PUBLICATIONS

Extended European Search Report from EP Appn. No. 16176717.3, dated Jan. 3, 2017, 6 pages.

Extended European Search Report from EP Appn No. 16176721.5, dated Jan. 3, 2017, 7 pages.

Extended European Search Report from EP Appn. No. 16176716.5, dated Jan. 3, 2017, 7 pages.

Extended European Search Report from EP Appn No. 16176719.9, dated Jan. 5, 2017, 8 pages.

Extended European Search Report from EP Appn. No. 16176718.1, dated Dec. 22, 2016, 9 pages.

Bruneau, Nicolas, et al., "Multi-Variate Higher-Order Attacks of Shuffled Tables Recomputation", http:// eprint.acr.org/2015/837.pdf, retrieved May 9, 2016, 20 pages.

Coron, Jean-Sebastien, "Higher Order Masking of Look-up Tables", International Association for Cryptologic Research, vol. 2014025:092212, Feb. 5, 2014, 22 pages.

Herbst, Christoph, et al., "An AES Smart Card Implementation Resistant to Power Analysis Attacks", Applied Cryptography and Network Security Lecture Notes in Computer Science; LNCS, Jan. 1, 2006, 14 pages.

Itoh, Kouichi, et al., "DPA Countermeansure Based on the "Masking Method"", ICICS 2001, LNCS 2288, 2002, pp. 440-456.

"Advanced Encryption Standard", Federal Information Processing Standards Publication 197, Nov. 26, 2001, 51 pages.

Brier, Eric, et al., "Correlation Power Analysis with a Leakage Model", Cryptographic Hardware and Embedded Systems—CHES 2004, vol. 3156 of Lecture Notes in Computer Science, 2004, pp. 16-29.

Chari, Suresh, et al., "Template Attacks", CHES 2002. LNCS, vol. 2523, 2003, pp. 172-186.

Gierlichs, Benedikt, et al., "Mutual Information Analysis", CHES 2008, vol. 5154 of LNCS, 2008, pp. 426-442.

Kocher, Paul C, et al., "Differential Power Analysis", Advances in Cryptology—CRYPTO '99, vol. 1666 of Lecture Notes in Computer Science, 1999, pp. 388-397.

Kocher, Paul C, "Timing attacks on implementations of Diffie-Hellman, RSA, DSS, and other systems", Advances in Cryptology—CRYPTO '96, vol. 1109 of Lecture Notes in Computer Science, 1996, pp. 104-113.

Kwon, Daesung, et al., "New Block Cipher: ARIA", Information Security and Cryptology—ICISC 2003, vol. 2971 of the series Lecture Notes in Computer Science, 2003, pp. 432-445.

Quisquater, Jean-Jacques, et al., "ElectroMagnetic Analysis (EMA): Measures and Counter-measures for Smart Cards", Smart Card Programming and Security, Springer Berlin / Heidelberg, vol. 2140, 2001, pp. 200-210.

\* cited by examiner

METHOD FOR PROTECTING SUBSTITUTION OPERATION AGAINST SIDE-CHANNEL ANALYSIS

CROSS REFERENCE TO RELATED APPLICATIONS

This application claims priority to European Application Numbers, EP16176716.5, EP16176717.3, EP16176718.1, EP16176719.9, EP16176721.5, each filed Jun. 28, 2016, the disclosures of which are incorporated herein by reference.

TECHNICAL FIELD

The present disclosure relates to methods and devices for protecting a circuit or a program against side channel analyses and providing a value of a secret data handled by the circuit or program, and in particular a circuit for transforming a message by an encryption or decryption algorithm using a secret key.

The present disclosure also relates to devices implementing a cryptographic algorithm, such as secure devices (smart card integrated circuits), hardware cryptographic components integrated onto mother boards of computers and other electronic and Information Technology (IT) equipment (Universal Serial Bus (USB) drives, television (TV) decoders, game consoles, etc.), or the like.

The present disclosure also relates to circuits implementing a cryptographic algorithm such as AES (Advanced Encryption Standard). The present disclosure also relates to programs implementing such an algorithm, provided for being executed in a secure or non-secured environment.

The present disclosure also relates to circuits and software implementing an operation combining two data which are required to be kept hidden.

BACKGROUND

Circuits implementing cryptographic algorithms can comprise a central processing unit (CPU), and a circuit dedicated to cryptographic computing, for example a cryptographic co-processor. These circuits may comprise thousands of logic gates that switch differently according to the operations executed. These switching operations create short variations in current consumption, for example of a few nanoseconds, and those variations can be measured. In particular, Complementary Metal Oxide Semiconductor CMOS-type integrated circuits include logic gates that only consume current when they switch, i.e., when a logic node changes its state to 1 or to 0. Therefore, the current consumption depends on data handled by the central processing unit CPU and on its various peripherals: memory, data and address buses, cryptographic co-processor, etc.

Furthermore, certain software programs using encryption or obfuscation techniques, such as the White-box Cryptography technique, may integrate secret data in such a way that it is very difficult to determine data by reverse engineering. Certain software programs may also receive a secret data from outside through a secure communication channel.

Such circuits may be subjected to so-called side channel-analysis attacks based on observing current consumption, or magnetic or electromagnetic radiation. Such attacks provide secret data, in particular encryption keys. Current side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. SPA analysis obtain information about the activity of the integrated circuit by observing part of the current consumption trace corresponding to a cryptographic computation, since the current trace consumption varies according to operations executed and data handled. Software may also undergo such side channel attacks during its execution by a circuit.

DPA and CPA analyses enable the key of an encryption algorithm to be found by acquiring numerous circuit consumption traces and by statistically analyzing these traces to find a target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous current consumption traces, aiming to highlight a measurement difference between two types of consumption traces distinguished according to formulated hypotheses.

CPA analysis is based on a linear current consumption model and involves computing a correlation coefficient between, firstly, the consumption points measured that form the captured consumption traces and, secondly, an estimated consumption value computed from a linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors and the wires connecting the transistors emit electromagnetic signals when their state changes, these signals can be treated like the current consumption variation signals by an analysis such as one of the SPA, DPA and CPA analyses.

Other side channel analyses exist, such as "Template analysis" and "Mutual Information Analysis" (MIA). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing by a circuit an operation applied to an input data including at least one word may include applying the operation to all data in an input set including data obtained by applying Exclusive OR (XOR) operations to the input data and to all first mask parameters in a first mask set, each first mask parameter in the first mask set including at least one word, the words in the first mask set having a same size and forming a first word subset including a single word from each first mask parameter of the first mask set and a same number of occurrences of all possible values of the words, and providing as an output of the operation, an output set including all data resulting from the application of the operation to one of the data in the input set, the output data being obtained by applying XOR operations to any one of the data in the output set and to a respective second mask parameter in a second mask set, each second mask parameter in the second mask set including at least one word, the words in the second mask set having a same size and forming a second word subset including a single word from each second mask parameter of the second mask set and a same number of occurrences of all possible values of the words.

Implementations can include one or more of the following features. For example, the first mask set may be generated using a random permutation function. The operation may be a substitution operation whereby an output data is selected in an input substitution table using the input data as an index.

The method may further include using masked substitution tables generated from the input substitution table and including one masked substitution table for each of the first mask parameters in the first mask set, and for each first mask parameter in the first mask set, selecting one of the masked substitution table corresponding to the first mask parameter, and selecting a first data in the selected masked substitution table, using as an index a second data corresponding to the first mask parameter in the input set, the output set including all the first data selected in one of the masked substitution tables.

In some implementations, the masked substitution tables may be generated by generating the first mask set, generating a second mask set including a number of second mask parameters equal to the number of values in the input substitution table, each second mask parameter having a same number of occurrences in the second mask set, selecting once each mask parameter respectively in the first and second mask sets to form mask pairs, each including one of the first mask parameters and one of the second mask parameters, generating for each mask pair one of the masked substitution table, the generation of each of the masked substitution tables including selecting each data in the input substitution table, and for each selected data: computing a masked data by applying XOR operations to the selected data and to the second mask parameter of the mask pair, computing a masked index by applying XOR operations to the first mask parameter of the mask pair and to an original index, and storing the masked data in the masked substitution table. The selected data may be selected at the original index and the masked data may be stored at the masked index, or the selected data may be selected at the masked index and the masked data may be stored at the original index.

In some implementations, the first and second mask parameters of each mask pair may be identical, or the second mask set may be deduced from the first mask set using a bijective function, combined or not with a shift function applied to the ranks of the first mask parameters in the first mask set, or the second mask set may be generated using a random permutation function, or the second mask set may be generated so that a combination by XOR operations of each of the first mask parameters in the first mask set with a corresponding second mask parameter in the second mask set may produce a third mask set including third mask parameters, each third mask parameter in the third mask set including at least one word, the words in the third mask set having a same size and forming a third word subset including a single word from each third mask parameter of the third mask set and a same number of occurrences of all possible values of a word having the size of the words in the third word subset.

In some implementations, the values in the masked substitution tables may be determined in a random order and/or stored in randomly selected positions in the masked substitution tables.

In some implementations, the computations of the data in the output set may be performed in a random order and/or stored in randomly selected positions in the output set.

In some implementations, the method may include detecting in the output set a computation error by detecting two identical data in the output set or applying XOR operations to each data in the output set and to a corresponding mask parameter in the first or second mask set, and searching in results of the XOR operations for a data different from an expected output data.

In some implementations, the cryptographic algorithm may conform with Advanced Encryption Standard (AES) algorithm. The method may include generating an input set by applying XOR operations to each word of the input data, to each mask parameter of the first mask set, and to a word of a secret key corresponding the word of the input data, performing several intermediate rounds, each including applying the substitution operation to each word in the input set, computing a masked round output set by applying XOR operations to each word of a round output set, to a respective mask parameter of the first mask set and to a respective mask parameter of the second mask set, and using the masked round output set as an input set for a next round, performing a last round including applying the substitution operation to each word in the input set, and providing an output set in which each word is masked by a respective mask parameter of the second mask set.

In some implementations, the first and second mask sets may be generated so that a third mask set resulting from a combination by XOR operations of each mask parameter of the first mask set with a corresponding mask parameter of the second mask set, may include only one occurrence of all possible values of a word of the input data.

In some implementations, the method may include generating a random permutation of a number of elements corresponding to a number of words in the input set, using the permutation to select the words in an input set of an operation of the cryptographic algorithm, and applying the operation to the words of the input set in an order defined by the permutation.

In some implementations, a new random permutation may be generated, during a first round of the cryptographic algorithm, and/or at each round of the cryptographic algorithm, and/or at a last round of the cryptographic algorithm, and/or before each operation of the cryptographic algorithm.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

Figure 1:
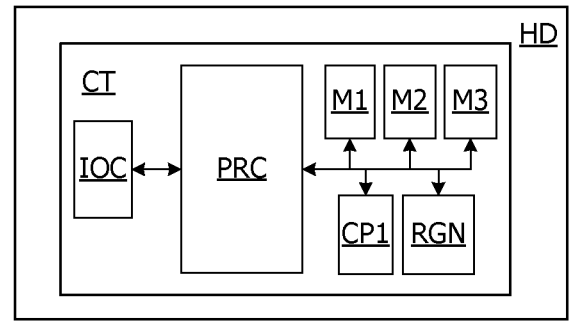
FIG. 1 illustrates a conventional architecture of a secure circuit.

In view of the drawbacks and considerations noted above, it may be desirable to propose a protection for an integrated circuit or a software program against one or more of side-channel analyses. To this purpose, it is known to mask a sensitive data using a random value, by combining the sensitive data with a randomly chosen mask by Exclusive OR (XOR) operations. For example, the following operation:

$$C = A \oplus B,$$

with A and B representing sensitive data, and "$\oplus$" representing the XOR operator can be protected using mask values U and V randomly chosen:

$$A' = A \oplus U,$$

$$B' = B \oplus V,$$

$$C' = A' \oplus B' = C \oplus U \oplus V,$$

Therefore the resultant data C is protected as being not directly present in the computing unit performing its computation, but it can be deduced from the masked data C' and the mask values U and V, using the following equation:

$$C = C' \oplus U \oplus V.$$

It may also be desirable to propose a protection method which is efficient against two-order known side-channel analyses. For instance, known protection methods having independent operations in a random order and/or dummy operations added which may require a temporal alignment of operations of a data processing to analyze. Such known methods may appear to be efficient against a first order version of the above-described analyses, but not against a second order version of some analyses methods that combines two analyses of distinct parts of a data processing and a correlating results of the two analyses.

Circuits against side channel analysis may be described in French Patent application no. FR16 51443 filed on Feb. 22, 2016 by Applicant, which discloses a method for analysing traces representative of the activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and each possible value of a part of a secret key involved in the operation. The method may then identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments may relate to a method for encrypting or decrypting an input data according to a cryptographic algorithm including a substitution operation.

Example embodiments may also relate to a circuit including a processor and configured to implement the above-defined methods. The circuit may include one circuit performing a substitution operation, for each masked substitution table. The circuit may include a co-processor.

Example embodiments may also relate to a device including a circuit as above-defined, arranged on a medium, such as, for example, a plastic card.

Example embodiments may also relate to a computer program product loadable into a computer memory and including code portions which, when carried out by a computer, configure the computer to carry out the steps of the methods as described herein.

FIG. 1 illustrates a secure integrated circuit CT, for example, arranged on a portable medium HD such as a plastic card or any other medium, or in a terminal such as a mobile terminal. The integrated circuit CT may include a microprocessor PRC, an input/output circuit IOC, memories M1, M2, M3 coupled to the microprocessor by a data and address bus and, optionally, a cryptographic computation co-processor CP1 or arithmetic accelerator, and/or a random number generator RGN. The memories can include a volatile memory M1, for example of RAM type ("Random Access Memory") containing volatile application data, a non-volatile memory M2, for example an Electrically Erasable Programmable Read-only Memory (EEPROM) or Flash memory, containing non-volatile data and application programs, and possibly a read-only memory M3 (or ROM memory) containing the operating system of the microprocessor and constant data. The operating system can be also stored in the non-volatile memory.

The communication interface circuit IOC may be of contact type, for example according to the "ISO/IEC 7816" standard, of contactless type by inductive coupling, for example according to the "ISO/IEC 14443 AB" or "ISO/IEC 13693" standard, of contactless type by electrical coupling (Ultra High Frequency—UHF-interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some implementations, the integrated circuit CT may be configured to execute operations of encrypting, decrypting and/or signing messages that may be sent to the integrated circuit CT, using cryptographic functions and/or operations. These cryptographic functions and/or operations can be carried out by the microprocessor PRC of the circuit CT or partially or totally entrusted by the microprocessor PRC to the co-processor CP1.

Example embodiments as described herein propose protection methods for an operation, e.g., an operation in a cryptographic algorithm against side channel analyses. Accordingly, the operation may receive an input data, and may provide an output data as a function of the value of the input data. In some implementations, a protection according to an example embodiment involves executing the operation to be protected for all the data of an input set of data. Each data in the input set including at least one word, wherein the words in the input set having a same size and forming a word subset or column including a single word from each data in the input set and a same number of occurrences of all the possible words in relation to the size of the words. Thus, the input set may include the input data required to be processed by the operation. The result provided by the operation may be an output set of data, in which each data may include at least one word. The words in the output set may have the same size and may form a word subset or column including a single word from each data in the output set and the same number of occurrences of all the possible words in relation to the size of the words.

As described herein, "word" may designate a group of bits in a data, and "word column" may designate a subset in a data set including a single word from all data in the data set, in which all the words in the word column may have the same size. The words forming a word column may not be necessary aligned, i.e., do not necessary includes the same bit positions in the data of the data set.

Figure 2:
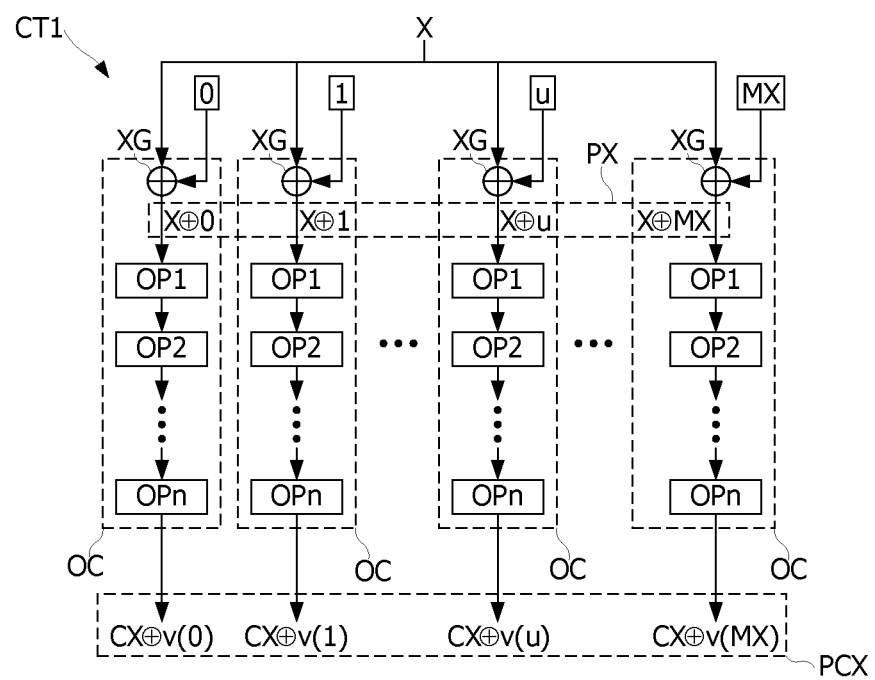
FIG. 2 is a block diagram of a protection circuit according to an example embodiment.

FIG. 2 illustrates a circuit CT1 receiving an input data X to be processed and serially performing several operations OP1, OP2, . . . OPn applied to the input data X. In some implementations, the circuit CT1 may include several circuits OC each serially performing the operations OP1, OP2, . . . OPn. Each circuit OC may receive the input data X and a respective input mask parameter u of an input mask parameter set. Thus, the circuit CT1 may include MX+1 circuits OC respectively receiving masks equal to 0, 1 . . . MX, MX representing the greatest possible value of the mask parameter u when considering the size in bits of the mask parameter. Each circuit OC may include a circuit XG applying Exclusive OR operations (XOR) to the input data X and to the mask parameter u (=0 or 1, . . . or MX). In each circuit OC, the data X⊕u (u=0, . . . MX) provided by the circuit XG of the circuit OC may be applied to an input of the operation OP1 of the circuit OC. The operations OP1-OPn are such that:

$$OPn( \ldots OP2(OP1(X \oplus u)) \ldots )=CX \oplus v(u), \quad (1)$$

where "⊕" represents the XOR operator, v(u) represents an output mask parameter depending on the input mask parameter u and CX is the result of the operations OP1-OPn applied to the input data X:

$$CX=OPn( \ldots OP2(OP1(X)) \ldots ) \quad (2)$$

Thus, each circuit OC may provide an output data equal to CX⊕v(u) (u=0, 1, . . . , or MX). Therefore, the circuit CT1 may provide an output set PCX including the output data CX⊕v(0), CX⊕v(1), . . . CX⊕v(u), CX⊕v(MX). The operations OP1-OPn can be adapted such that the output data corresponding to the input data X⊕u provided by the operations OP1-OPn may be equal to CX⊕v(u) for each value of the mask parameter u (0-MX) and the set of output mask parameters v(u) with u=0 to MX, may include a same number of occurrences of all possible values when considering the size of the output masks parameters v(u). Each output mask parameter v(u) can be equal to the corresponding input mask parameter u. In some implementations, the computations of the output data in the output set PCX may be performed in a random order, and/or stored in a random order. In this way, the different values of the mask parameter u may be respectively applied to the circuits OC in a random order. Thus, the circuit OC of rank k in the circuit CT1 may receive an input mask parameter u=U[k], U being a mask set generated by random permutation of all possible numbers between 0 and MX. In a same way, the circuit OC of rank 0 in the circuit CT1 may receive a mask parameter U[0], and the circuit OC of rank MX in the circuit CT1 may receive an input mask parameter U[MX].

In other implementations, the circuits OC may be independent from each other and the computation of each of the data CX⊕v(u) of the output set PCX may be independent from the computations of the other data of the output set. Therefore the operations OP1-OPn in all the circuits OC can be performed in any order, provided that the order of the operations within each circuit OC is respected.

Unlike the protections of prior circuits involving hiding the operation to be protected in a flood of identical operations applied to random data, and thus, uncorrelated from the required input data of the operation to be protected, example embodiments herein are to execute the operation on other data not chosen randomly. Indeed, such other data may be correlated with the required input data insofar as the input set formed of such other data and of the required data to be processed is such that each data in the input set may include at least one word. The words in the input set may have the same size and may form a word subset or column including a single word from each data in the input set and a same number of occurrences of all possible values of one word in relation to word size. The words forming a word column may not be necessary aligned, i.e., do not necessary includes the same bit positions in the data of the data set. Since the processed input data are not randomly chosen, statistical analyses cannot extract a signal reflecting the processing of the required input data from a signal including a random part. The different mask parameters could have unpredictable positions in the mask set, but known by the circuit performing the operation.

In some implementations, if the circuit CT1 performing the operations OP1-OPn undergoes an error such as one caused by a successful fault injection, the value of at least one word of the data in the output set PX is changed. If only one word is changed, each word rank of the data in the output set does not include all possible values of the words, but includes two identical words. The word may have a changed value having necessary the value of another word in the same word rank in the output set. Thus, such a fault injection can be detected by looking for two data in the output set having a same value. If two data are changed, the fault injection would not be detected only when the values of these two data are swapped, which has a very low probability of occurrence. Due to the property of the XOR operation, an error can be easily detected by combining together by XOR operations, all the output data in the output set PCX. The result of this combination may be equal to zero when the output set includes at least one word column including all possible values of the words with a same number of occurrences. In other implementations, in order to detect a fault injection is to add each word in the output set with the corresponding mask parameter by XOR operations. The results of the XOR operations should all be equal to a word of the expected output data of the operation.

Figure 3:
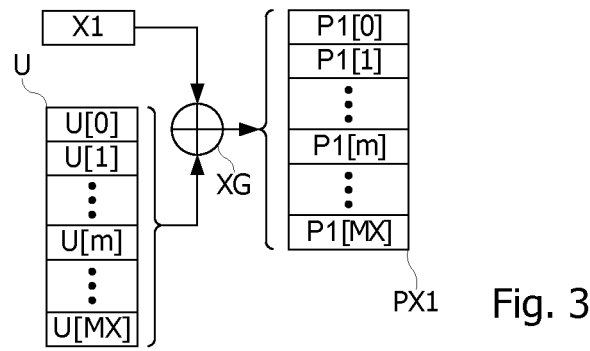
FIG. 3 is a block diagram of data illustrating a method for protecting data, according to an example embodiment.

FIG. 3 illustrates an example of the input data X1 which may be combined by an operation XG of the circuits OC with a mask set U including mask parameters U[0 . . . MX], MX being an index having the greatest possible value of the input data X1 taking into account the size in bit number of the data X1. The result provided by the operation XG may be an output set PX1, for example arranged in a table, including the data P1[0], P1[1], . . . P1[$m$], P1[MX], where each data P1[$m$] may be equal to X1$\oplus$U[m]. The data in the output set PX1 can be arranged and/or computed in a random order.

Figure 4:
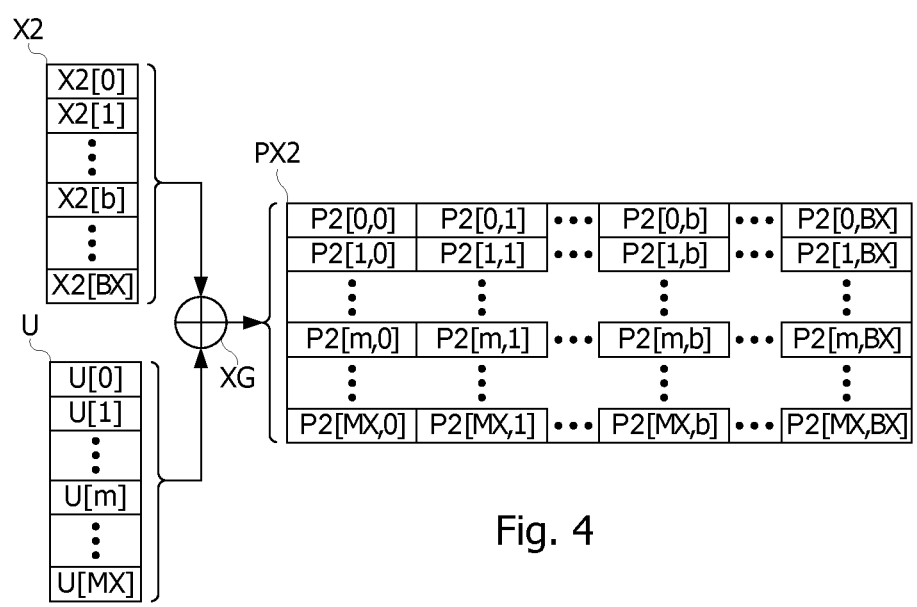
FIG. 4 is a block diagram of data illustrating a method for protecting data, according to another example embodiment.

FIG. 4 illustrates an input data X2 including several words X2[0], X2[1], . . . X2[$b$], . . . X2[BX] in accordance with another example embodiment. In some implementations, each word of the input data X2 may be combined by the operation XG of the circuits OC with a respective mask parameter U[0], . . . U[MX] of the mask set U, where each mask parameters U[0], . . . U[MX] has the size of one word, and the index MX corresponds to the greatest possible value of one word of the input data X2 or of the mask parameters U[m], taking into account the size in bit number of each of these words. The result provided by the operation XG may be an output set PX2, for example arranged in a table PX2[0 . . . MX,0 . . . BX] including data P2[$m,b$]=X2[$b$]$\oplus$U[m], where m varies between 0 and MX and b varies between 0 and BX. The data in the output set PX2 can be arranged and/or computed in a random order.

Figure 5:
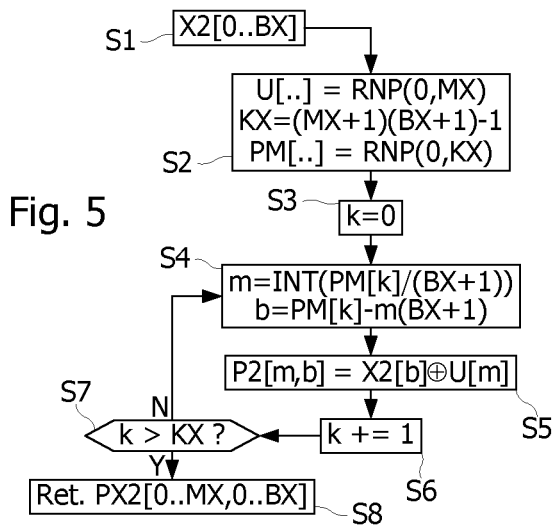
FIG. 5 is a flowchart of a method for protecting data, according to an example embodiment.

FIG. 5 illustrates steps (operations, functions, processes, etc.) S1 to S8 of a procedure for generating the input set PX2 from the input data X2 including BX+1 words to be applied to the operation XG of the circuits OC, according to an example embodiment. Steps S1 to S7 may be first successively carried out. At step S1, the input data X2 may be provided to the procedure. At step S2, two permutations U and PM in the form of tables may be generated randomly using a random permutation generation function RNP receiving extremum values 0 and MX for the permutation U and 0 and KX for the permutation PM. The permutation U may include MX+1 values between 0 and MX, where MX+1=2P, P being the number of bits of each of the words X2[b] forming the input data X2. The permutation PM may include (MX+1)(BX+1) values between 0 and the maximum value KX equal to (MX+1)(BX+1)−1. At step S3, an index k may be initialized to zero (0). At step S4, indexes m and b may be computed from the index k by considering that the permutation PM is a two-entry table including rows of BX+1 elements and columns of MX+1 elements. Thus, the index m can be computed as being the integer part INT( ) of the division of the value PM[k] by (BX+1), and the index b can be computed as being the difference between the value PM[k] and the product of the index m by (BX+1). Step S5 may compute the table elements P2 of the two-entry table PX2. Each table element P2[m,b] at indexes m and b may be set to the result X2[b] U[m] of XOR operations applied to the words X2[b] and U[m]. Due to the use of the random permutation PM, the words P2[m,b] may be computed in a random order and arranged in the table PX2, which may also be in a random order. At step S6, the index k may be incremented by one (1). At step S7, the index k may be compared with the maximum value KX. If the index k is greater than the value KX, step S8 may be carried out, otherwise steps S5 to S7 may again be carried out for a new iteration. At step S8, the input set PX2 may be completely defined and may provide as output of steps S1 to S7.

In some implementations, the generation and use of the permutation PM can be omitted if the data in the table PX2 can be computed and/or stored in a predetermined order. In addition, the large permutation PM can be replaced by two permutations of MX+1 elements and BX+1, respectively. The elements of which may be read within two nested loops. For example, one for selecting an element of a first one of the two permutations and, one for selection an element of the other one of the two permutations.

The operations OP1-OPn can include an operation combining the input data X1 to another data by XOR operations.

Figure 6:
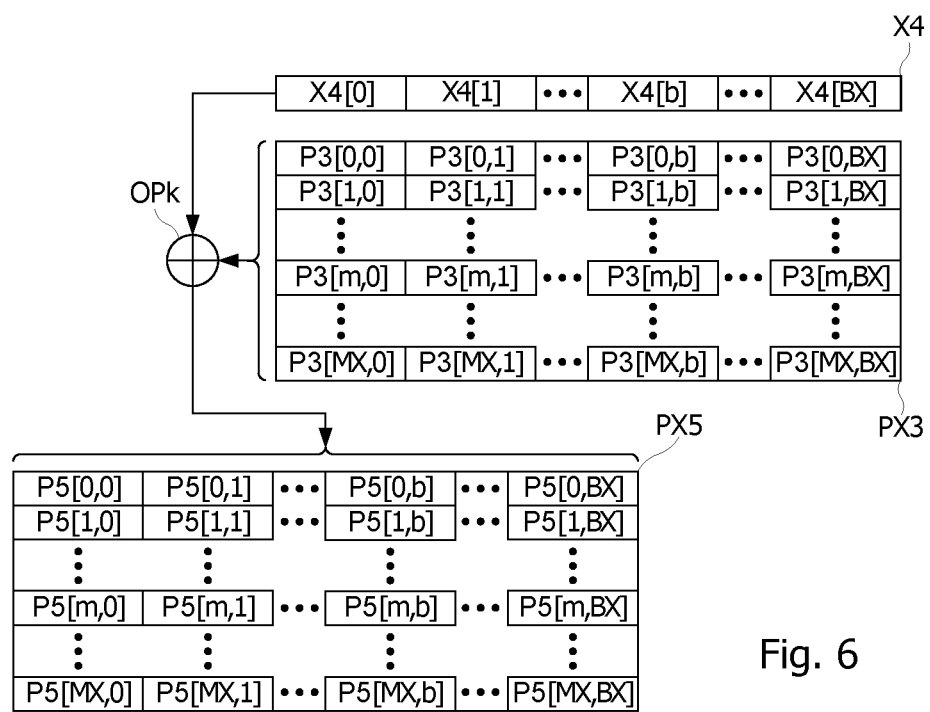
FIG. 6 is a block diagram of data illustrating an operation protected according to an example embodiment.

FIG. 6 illustrates an example of one operation OPk of the operations OP1-OPn, combining with each other data X3 and X4. The data X3 may result from a previous operation among the operations XG, OP1-OPn, and thus has the form of an output set PX3 (like the output set PX2) including words P3[0,0], . . . P3[MX,BX]. The data X4 may have the same size as the data X3, and thus, may include words X4[0], . . . X4[$b$], . . . X4[BX]. The result provided by the operation OPk may be an output set PX5, for example arranged in a two-entry table, including the data P5[$m,b$], where m varies between 0 and MX and b varies between 0 and BX. Thus each output data P5[$m,b$] may be equal to OPk(P3[$m,b$], X4[$b$]). The data in the output set PX5 can be arranged and/or computed in a random order. The operation OPk may be for example an XOR operation.

Figure 7:
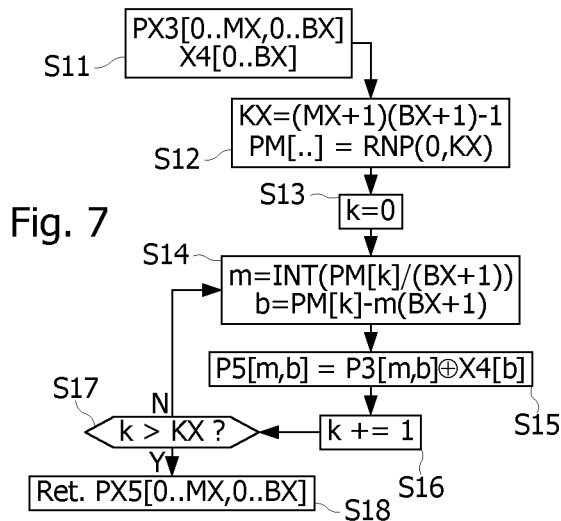
FIG. 7 is a flowchart of an operation protected according to an example embodiment.

FIG. 7 illustrates steps (operations, functions, processes, etc.) S11 to S18 of a procedure for generating the output set PX5 resulting from the application of an operation to the output set PX3 and the data X4, according to an example embodiment. Steps S11 to S17 may be first successively carried out. At step S11, the output set PX3 and the input data X4 including BX+1 words may be input. At step S12, a permutation PM in the form of a table may be randomly generated using the function RNP, the permutation PM including (MX+1)(BX+1) values between 0 and a maximum value KX=(MX+1)(BX+1)−1, where MX+1=2P, P being the number of bits of each of the words X4[$b$] forming the input data X4. At step S13, an index k may be initialized to zero (0). At step S14, indexes m and b may be computed from the index k by considering that the permutation PM may be a two-entry table including rows of BX+1 elements and columns of MX+1 elements. Thus, the index m can be computed as being the integer part of the division of the value PM[k] by (BX+1), and the index b can be computed as being the difference between the value PM[k] and the product of the index m by (BX+1). Step S15 may compute output data P5[$m,b$] of the output set PX5 in the form of a two-entry table. Each output data P5[$m,b$] at indexes m and b may be set to the result OPk(P3[$m,b$],X4[$b$]) of the operation OPk applied to the words P3[$m,b$] and X4[$b$]. Due to the use of the permutation PM, the output data P5[$m,b$] in the table PX5 may be computed in a random order and arranged in the table PX5 also in a random order. At step S16, the index k may be incremented by one (1). At step S17, the index k may be compared with the maximum value KX. If the index k is greater than the value KX, step S18 may be carried out; otherwise steps S15 to S17 may again be carried out for a new iteration. At step S18, the output set PX5 may be completely defined and may provide as output for steps S11 to S17.

In the example implementation of step S15 in FIG. 7, the operation OPk may be an XOR operation. Thus, the output data P5[m,b] in the output set PX5 may be equal to P3[m,b]. $\oplus$X4[b], for each indexes m (=0 . . . MX), and for each index b (=0 . . . BX). It can be observed that each data P5[m] (of size BX+1) in the output set PX5 may be the result of the operation P3[m]$\oplus$X4 where P3[m]=X1$\oplus$U[m]. If CX1=X1$\oplus$X4, then P5[m]=X1$\oplus$X4$\oplus$U[m]=CX1$\oplus$U[m]. Therefore, the mask U[m] applied to the input value X1 can be retained throughout the computations performed by the operations OPi in the circuits OC. The operation OPk can be any other operation than XOR, provided that this operation is performed bitwise and is reversible or bijective.

In some implementations, it is not necessary to compute the data in the table PX5 in a random order or to store the data in a random order. In such cases, the use of the permutation PM may not be mandatory.

It may be further desirable to have among the operations OPi a substitution operation using a substitution or lookup table. Such a substitution operation may receive an input data, and may provide an output data read in the table using the input data as an index. According to an example embodiment, a masked substitution table SBM may be computed using the following equation:

$$SBM[i \oplus U] = SB[i] \oplus V, \quad (3)$$

where SB is the substitution or lookup table, i is an index for selecting a value SB[i] in the substitution table SB and U and V are input and output masks respectively.

Figures 8A, 8B:
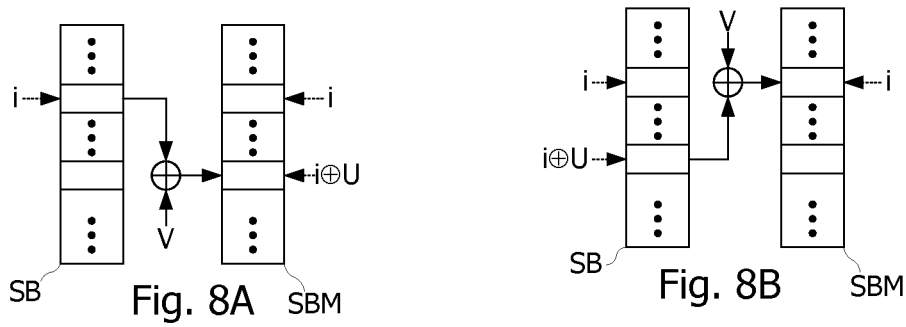
FIG. 8A is a block diagram of substitution tables, illustrating a method for protecting a substitution table, according to an example embodiment.
FIG. 8B is a block diagram of substitution tables, illustrating a method for protecting a substitution table, according to another example embodiment.

FIG. 8A illustrates the substitution table SB and the masked substitution table SBM derived from the substitution table SB by applying equation (3) to each value SB[i] in the substitution table SB. Thus, the result of the substitution operation applied to a masked input data D$\oplus$U may be an output data masked by the known output mask V.

As illustrated in FIG. 8B, the masked substitution table SBM can also be obtained by applying the following equation:

$$SBM[i] = SB[i \oplus U] \oplus V, \quad (4)$$

to each value SB[i] of the substitution table SB.

Therefore, the expected output data CX1 can be deduced from the output data provided by the circuit OC processing the masked input data X$\oplus$U. However the output data CX1 cannot be deduced from the output data provided by the other circuits OC since in these other circuits, the input data applied to the substitution operation may not be combined with the mask parameter U used to generate the mask substitution table SBM according to equation (3) or (4).

According to an example embodiment, a masked substitution table SBM[u] may be computed for each circuit OC, such that:

$$SBM[u, D \oplus u] = SB[D] \oplus v(u), \quad (5)$$

for each value of the mask parameter u (0 . . . n), where v(u) is a mask parameter corresponding to the value of the mask parameter u, such that v(u1)≠v(u2) for all mask parameters u1, u2 with u1≠u2. Therefore, each output data of the substitution operation performed by the circuits OC may be equal to the output data CX masked by the mask parameter v(u) (=CX$\oplus$v(u)).

Figure 8C:
FIG. 8C is a block diagram of substitution tables, illustrating a method for protecting a substitution table, according to another example embodiment.

FIG. 8C illustrates the substitution table SB and the masked substitution table SBM according to an example embodiment. The substitution table SB may be a single-entry table including MX+1 values SB[0], SB[1], . . . SB[MX]. The masked substitution table SBM may be a two-entry table including one single-entry table SBM[u] of the size of the substitution table SB for each mask value u. Thus, the masked substitution table SBM may include MX+1 single-entry tables of the size of the substitution table SB.

Figure 9:
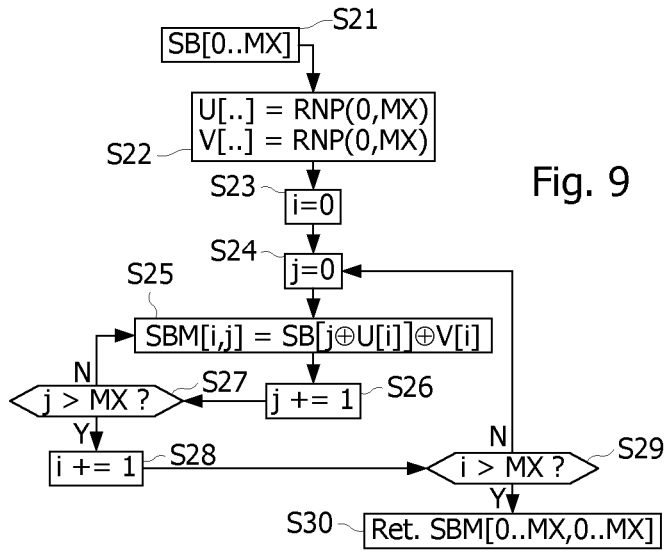
FIG. 9 is a flowchart of a method for generating a protected substitution table, according to an example embodiment.

FIG. 9 illustrates steps (operations, functions, processes, etc.) S21 to S30 of a procedure for computing a masked substitution table SBM from the substitution table SB, according to an example embodiment. Steps S21 to S27 may be first successively carried out. At step S21, the substitution table SB may be input. At step S22, two permutations U and V in the form of tables may be randomly generated using the function RNP. The permutations U and V include MX+1 values between 0 and MX, where MX+1 may be the amount of values in the table SB. At steps S23 and S24, respectively, indexes i and j may be initialized to zero (0). Step S25 may compute the table values SBM[i,j] of the two-entry table SBM. Each table value SBM[i,j] at indexes i and j may be set to the result SB[j$\oplus$U[i]]$\oplus$V[i] of XOR operations applied to the data SB[j$\oplus$U[i]] and V[i]. At step S26, the index j may be incremented by one (1). At step S27, the index j may be compared with the maximum value MX. If the index j is greater than the value MX, step S28 may be carried out; otherwise steps S25 to S27 may again be carried out for a new iteration. At step S28, the index i may be incremented by one (1). At step S29, the index i may be compared with the maximum value MX. If the index i is greater than the value MX, step S30 may be carried out; otherwise steps S24 to S27 may again be carried out for a new iteration. At step S30, the masked substitution table SBM may be completely defined and may be provided as output of steps S21 to S29. Thus, each column i of the masked substitution table SBM may correspond to the substitution table SB masked using a particular couple of masks (U[i], V[i]).

Figure 10:
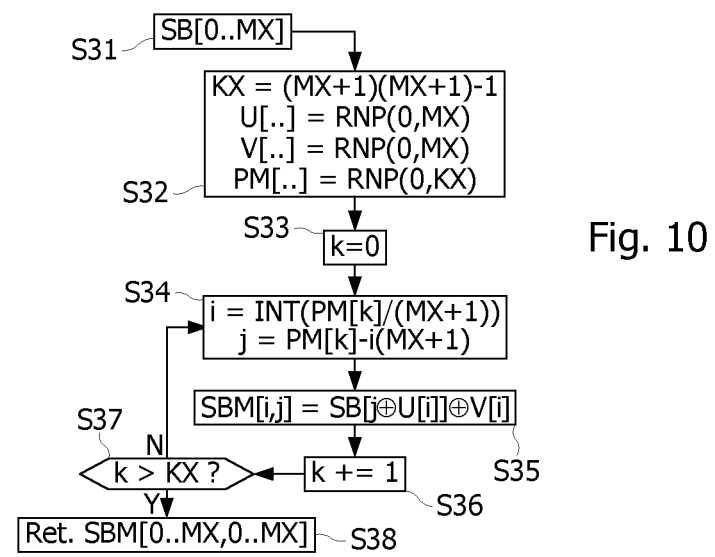
FIG. 10 is a flowchart of a method for generating a protected substitution table, according to another example embodiment.

FIG. 10 illustrates (operations, functions, processes, etc.) steps S31 to S38 of a procedure for computing the masked substitution table SBM from the substitution table SB, according to an example embodiment. Steps S31 to S37 may be first successively carried out. At step S31, the substitution table SB may be input. At step S32, three permutations U, V and PM in the form of tables may be randomly generated using the function RNP. The permutations U and V may include MX+1 values between 0 and MX, where MX+1 may be the amount of values in the table SB. The permutation PM may include (MX+1)(MX+1) values between 0 and a maximum value KX equal to (MX+1)(MX+1)−1. At step S33, an index k may be initialized to zero (0). At step S34, indexes i and j may be computed from the index k by considering that the permutation PM may be a two-entry table including rows of MX+1 elements and columns of MX+1 elements. Thus, the index i can be computed as being an integer part of a division of the value PM[k] by (MX+1), and the index j can be computed as being a difference between the value PM[k] and a product of the index i by (MX+1). Step S35 may compute the table values SBM[i,j] randomly selected in the masked substitution table SBM, using the random permutation PM. Each value SBM[i,j] at indexes i and j in the masked substitution table SBM may be set to the result SB[j$\oplus$U[i]]$\oplus$V[i] of an XOR operation applied to the data SB[j$\oplus$U[i]] and V[i]. The mask parameters U[i] and V[i] may be also randomly selected in the tables U and V since the indexes i and j are defined using the permutation PM. At step S36, the index k may be incremented by one (1). At step S37, the index k may be compared with the maximum value KX. If the index k is greater than the value KX, step S38 may be carried out; otherwise steps S35 to S37 may again be carried out for a new iteration. At step S38, the masked substitution table SBM may be completely defined and may be provided as output of steps S31 to S37.

In some implementations, in a process including the procedures of FIGS. 5 and 9 or 10, a single permutation U may be generated and used at steps S5 and S25 or S35.

Figure 11:
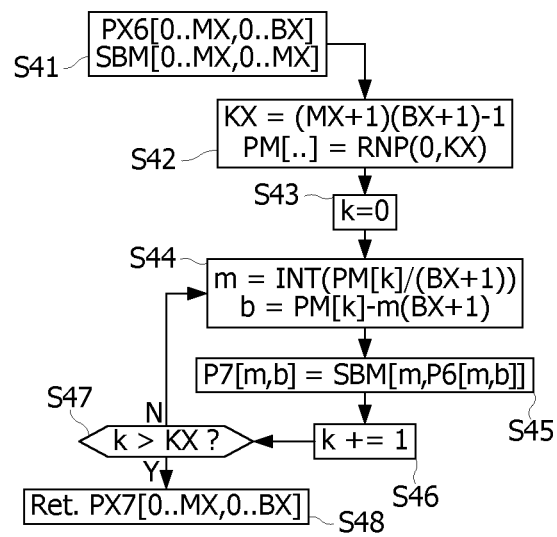
FIG. 11 is a flowchart of a substitution operation protected according to an example embodiment.

FIG. 11 illustrates steps (operations, functions, processes, etc.) S41 to S48 of a procedure performing a protected substitution operation, using the masked substitution table SBM, according to an example embodiment. Steps S41 to S47 may be first successively carried out. At step S41, the masked substitution table SBM and a protected data in the form of an input set PX6 may be input. The input set PX6 may include words P6[0,0], . . . P6[MX,BX]. At step S42, one permutation PM in the form of a table may be randomly generated using the function RNP. The permutation PM may include (MX+1)(BX+1) values between 0 and the maximum value KX equal to (MX+1)(BX+1)−1. At step S43, an index k may be initialized to zero (0). At step S44, indexes m and b may be computed as in step S4. Step S45 may compute the output data P7[$m,b$] randomly selected in the output set PX7, using the random permutation PM. Each output data P7[$m,b$] at indexes m and b may be set to the value of the element SBM[m,P6[$m,b$]] selected in the table SBM[m] at an index defined by the output data P6[$m,b$] selected in the table PX6 at indexes m and b. At step S46, the index k may be incremented by one (1). At step S47, the index k may be compared with the maximum value KX. If the index k is greater than the value KX, step S48 may be carried out; otherwise steps S44 to S47 may again be carried out for a new iteration. At step S48, the output set PX7 may be completely defined and may be provided as output of steps S41 to S47.

In some implementations, the number of the possible masked substitution tables SBM obtained from a same substitution table SB, is reduced by choosing identical tables for the mask tables U and V. Thus the equations (3) and (4) become:

$$SBM[D \oplus U]=SB[D] \oplus U, \quad (6)$$

and $$SBM[D]=SB[D \oplus U] \oplus U, \quad (7)$$

The operations performed at steps S25 and S35 become:

$$SBM[i,j]=SB[j \oplus U[i]] \oplus U[i] \quad (8)$$

Accordingly, the number of possible masked substitution tables may be reduced by a factor (MX+1), which may enable all the possible masked tables to be precomputed and stored in a memory, instead of being computed and stored each time new mask tables U and V are generated.

In some implementations, the generation of a random permutation may have a non-negligible cost in terms of amount of required computation operations. For example, the generation of one of the permutations U and V at steps S22, S32 may be avoided by computing the values of the mask table V as a function of the values of the mask U, or inversely. For example, each value V[m] of the mask table V may be chosen equal to U[m]$\oplus$K, K being a constant parameter which may be randomly chosen when the mask table U is generated. In other implementations, each value V[m] may be chosen equal to U[m$\oplus$K1]$\oplus$K2, K1, K2 being constant parameters which may be randomly chosen when the mask table U is generated. The mask table V can also be randomly generated and the mask table U determined in a same way as a function of the values in the table V.

In some implementations, the number of different values in the substitution table SB can be smaller than its number of values. Thus, each value in the table SB may have a same number of occurrences greater than one. In such a case, the mask table V may be generated so as to include the same number of occurrences of the same values in the table SB.

All the operations performed in AES (Advanced Encryption Standard) algorithm either implemented by software or in hardware can be protected using the procedures previously disclosed. For example, the architecture presented in FIG. 2 can be applied to AES algorithm.

Figure 12:
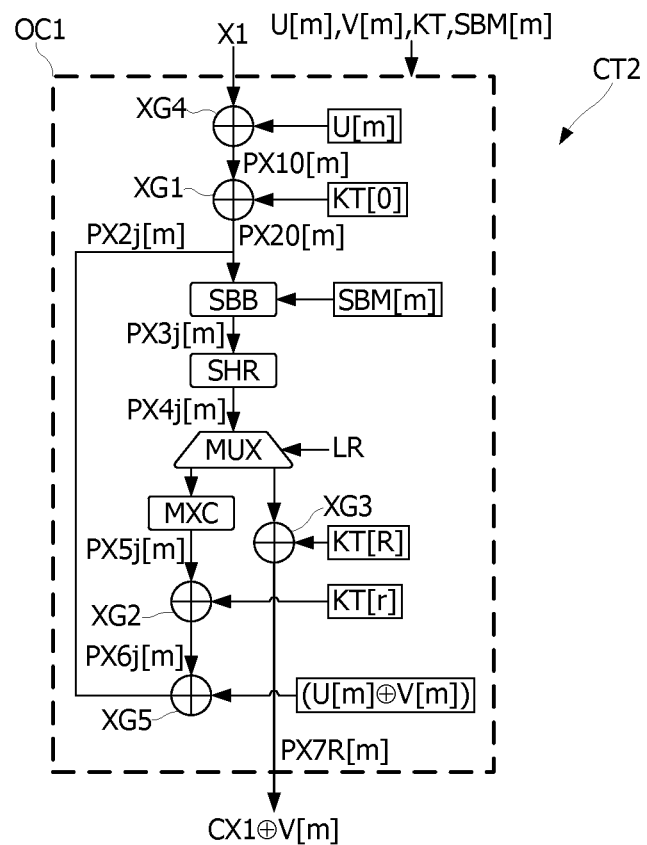
FIG. 12 is a block diagram of an AES encryption circuit protected according to an example embodiment.

FIG. 12 illustrates a cryptographic calculation circuit OC1 as an example of the circuit OC of FIG. 2. The OC1 may implement the AES algorithm for encrypting a data. For further details about AES algorithm, the document "Advanced Encryption Standard FIPS PUB 197" published on 26 Nov. 2001 can be referred to. The cryptographic calculation circuit OC1 may be included in a circuit CT2 including several cryptographic calculation circuits OC1. Each cryptographic calculation circuits OC1 may receive a data X1 to be processed and a mask parameter index m, and may supply a resultant data CX1 combined by XOR operations with a mask parameter V[m] corresponding to the mask parameter index m.

The circuit OC1 may include circuits XG1, XG2, XG3 performing XOR operations, a substitute calculation circuit SBB, a row-based circular permutation calculation circuit SHR, a multiplexer MUX, and a column-based permutation calculation circuit MXC. The circuits SBB, SHR, and MXC may be compliant with the AES. The circuit XG1 may receive both the data X1 to be encrypted and a derived key KT[0] at an index 0 in a round key table KT supplied to the circuit OC1. The output of the circuit XG1 may be processed by the circuits SBB and SHR. The output of the circuit SHR may be transmitted by the multiplexer MUX to the circuit MXC at rounds 0 to R−1 of the AES algorithm, and at a last round R, to the circuit XG3 receiving at another input a last derived key KT[R] at an index R in the round key table KT. At the rounds 0 to R−1, the output of the circuit MXC may be processed by the circuit XG2 receiving a derived key KT[r] (r=1, . . . , R−1) read in the table KT. The output of the circuit XG2 may be processed by the circuits SBB and SHR. When a certain number (R−1) of calculation rounds are performed (10, 12 or 14, in accordance with AES algorithm) by the chain including the circuits SBB, SHR, MXC, XG2, the multiplexer MUX may be actuated to provide the output of the circuit SHR to the input of the circuit XG3 which may provide the output data CX1.

During a first calculation round, the data X1 may be processed by the circuit XG1 which may be added to the first derived key KT[0] by XOR operations. The circuit XG1 may provide the resulting data X1$\oplus$K[0] which may be successively processed by the circuits SBB, SHR, MXC and XG2. Then the circuit XG2 may combine the data provided by the circuit MXC with a derived key KT[r] (r=1, . . . , R−1). The circuits SBB, SHR, MXC and XG2 may be successively activated for several rounds of the AES algorithm. The circuits SBB, SHR and XG3 may be activated at a last round R of the AES algorithm. At each round j, a round key KT[r] (r=0, . . . , R) may be read in the table KT.

The substitute calculation circuit SBB may be generally implemented using a substitution table receiving an input data used as an index to select an output data in the substitution table. The substitution table may include 256 bytes, and each byte of the data to be processed by the circuit SBB may be used as an index to select a byte in the substitution table SB. The permutation calculation circuit SHR can be placed before the substitute calculation circuit SBB.

According to an example embodiment, the circuit OC1 may include circuits XG4 and XG5 performing XOR operations with mask parameters U[m] and U[m]⊕V[m] respectively (with m=0, . . . MX). The circuit XG4 may receive the mask table U[0 . . . MX] including MX+1 mask parameters having the size of one word (e.g. one byte), and the input data X1[0 . . . BX] of BX+1 words (16 bytes, BX=15) of the size of the mask parameters, and may perform XOR operations with the mask parameters U[m] for each word of the size of the mask parameter included in the input data X1. The circuit XG4 may provide to the circuit XG1 a masked input data, noted X1⊕U[m] for each value of the index m. Thus, the circuit XG4 can implement the steps S1 to S8 of FIG. 5, XOR operations being performed for each mask parameter U[m] in the mask table U[0 . . . MX], a randomly selected permutation of 256 values between 0 and 255. The result provided by the circuit XG4 to the circuit XG1 may be the output set PX10 having the form of the output set PX2[0 . . . MX, 0 . . . BX] (FIGS. 4, 5). The operation performed by the circuits XG1, XG2 and XG3 may be realized according to FIG. 6, by executing the steps S11 to S18 (FIG. 7). The input set of the circuit XG1 may be the output set PX10 provided by the circuit XG4, and may have the form of the input set PX3 in FIG. 7. The input data X4 in FIG. 7 may be the round key KT[0,0 . . . BX] for the circuit XG1, the round key KT[r,0 . . . BX] (r=1, . . . R−1) for the circuit XG2, and the round key KT[R,0 . . . BX] for the circuit XG3, each round key in the table KT including BX+1 bytes. The circuit XG1 may provide an output set PX20[0 . . . MX,0 . . . BX] having the form of the output set PX5[0 . . . MX,0 . . . BX] (FIG. 7).

The substitution table SB provided to the circuit SBB may be the two-entry table SBM[0 . . . MX,0 . . . MX] generated by executing the steps of FIG. 9 or 10, and obtained with the masks tables U and V. The mask table U may be the same as the one input to the circuit XG4. The operation performed by the circuit SBB may include the steps S41 to S48 as disclosed in FIG. 11, in which the input set PX6 may be the output set PX20 provided by the circuit XG1. The circuit SBB may provide an output set PX3j (PX30 for the round 0) in the form of the output set PX7[0 . . . MX,0 . . . BX] (FIG. 11).

The circuit SHR may be designed to process separately each data PX3j[m, 0 . . . BX] (m=0, . . . MX) in the output set PX3j. The circuit SHR may provide an output set PX4j[0 . . . MX,0 . . . BX] including a table PX4j[m,0 . . . BX] for each value (0 to MX) of the index m. The circuit MXC may provide an output set PX5j[0 . . . MX,0 . . . BX].

Figure 13:
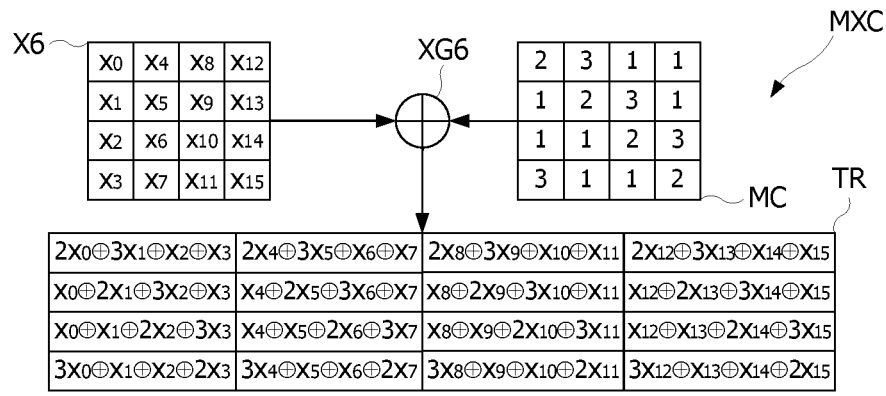
FIG. 13 is a block diagram of a conventional mix column operation in AES encryption algorithm.

FIG. 13 illustrates the circuit MXC accordance to an example embodiment. The circuit MXC may combine an output data X6 of the circuit SHR with a coefficient matrix MC of 4×4 elements. To this purpose, the output data X6 may be organized into a matrix format of 4×4 elements x0 to x15. Each of the elements of the matrix X6 corresponding to the bytes of the data X6 which may be encoded on 128 bits. The elements of the matrix X6 may be combined together by XOR operation circuit XG6 with the elements of the matrix MC to produce a resultant matrix TR of 4×4 elements where each element has the following form:

$$a \cdot x\langle i \rangle \oplus b \cdot x\langle i+1 \rangle \oplus c \cdot x\langle i+2 \rangle \oplus d \cdot x\langle i+3 \rangle, \quad (9)$$

where a, b, c, d (=1, 2 or 3) are the elements of one line of the matrix MC and i is equal to 0, 4, 8 and 12. In accordance to AES algorithm, the operation 2·x may be performed by using the operation LS1(x) if x is lower than 128 (when the most significant bit (MSB) of x equals 0) and the operation LS1(x)⊕0x1B if x is greater or equal to 128 (when the MSB of x equals 1), LS1(x) representing a shift to the left by one bit in the byte x. The operation 3·x is performed using the operation 2·x⊕x.

Since each byte b of the input data X6 is represented by one table PX4j[0 . . . MX,b], the circuit MXC may perform 3×16 XOR operations for each byte in the output set PX4j. One more XOR operations may be necessary to perform the operation 3·x. In some implementations, the operations 2·x and 3·x may be implemented by lookup tables.

Figure 14:
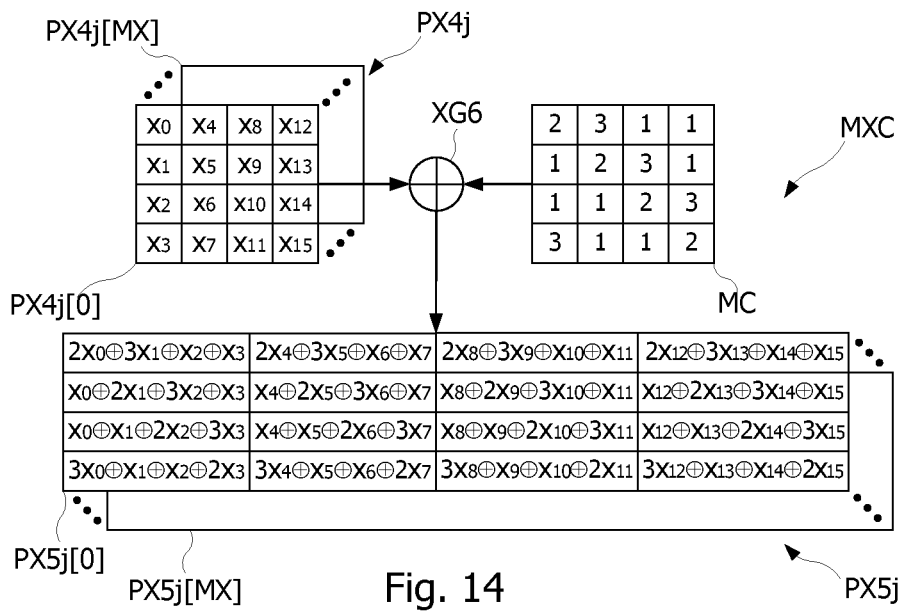
FIG. 14 is a block diagram of an AES mix column circuit of a protected AES encryption circuit, according to an example embodiment.

As illustrated in FIG. 14, the XOR operations for computing an element of the matrix TR as disclosed in FIG. 13 is performed within each table PX4j[m], and these operations provides a table PX5j[m] for each table PX4j[m].

In addition, the order of the operations should be examined when performing the operations of the circuit MXC to keep the masks on the data, since each byte x'<j> is masked by a same mask v (=V[m], x'<j>=x<j>⊕v). The operations of the equation (9) are performed by applying the following property:

$$a(x \oplus v) = ax \oplus av, \text{ with } a=2 \text{ or } 3. \quad (10)$$

Thus:

$$\begin{aligned} A &= 2x\langle 0 \rangle \oplus 3x\langle 1 \rangle \oplus 2v \oplus 3v \oplus x'\langle 2 \rangle \oplus x'\langle 3 \rangle \\ &= 2x\langle 0 \rangle \oplus 3x\langle 1 \rangle \oplus 2v \oplus 2v \oplus v \oplus x'\langle 2 \rangle \oplus x'\langle 3 \rangle \\ &= 2x\langle 0 \rangle \oplus 3x\langle 1 \rangle \oplus v \oplus x\langle 2 \rangle \oplus v \oplus x'\langle 3 \rangle \\ &= 2x\langle 0 \rangle \oplus 3x\langle 1 \rangle \oplus x\langle 2 \rangle \oplus x'\langle 3 \rangle \end{aligned} \quad (11)$$

Therefore, at this step of the computations, the mask v is removed, which can form a leakage exploitable by a side-channel analysis to determine the data x, even if the mask v reappears when the last XOR operation is performed:

$$A = (2x\langle 0 \rangle \oplus 3x\langle 1 \rangle \oplus x\langle 2 \rangle \oplus x\langle 3 \rangle) \oplus v. \quad (12)$$

In contrast, if the computation of element A is performed in the following order:

$$A = 2x'\langle 0 \rangle \oplus x'\langle 2 \rangle \oplus x'\langle 3 \rangle \oplus 3x'\langle 1 \rangle, \quad (13)$$

we obtain:

$$\begin{aligned} A &= 2x\langle 0 \rangle \oplus x\langle 2 \rangle \oplus x'\langle 3 \rangle \oplus 3x'\langle 1 \rangle \oplus 2v \oplus v \\ &= 2x\langle 0 \rangle \oplus x\langle 2 \rangle \oplus x\langle 3 \rangle \oplus 3x'\langle 1 \rangle \oplus 3v \oplus v \\ &= 2x\langle 0 \rangle \oplus x\langle 2 \rangle \oplus x\langle 3 \rangle \oplus 3x'\langle 1 \rangle \oplus 2v \oplus v \oplus v \\ &= 2x\langle 0 \rangle \oplus x\langle 2 \rangle \oplus x\langle 3 \rangle \oplus 3x\langle 1 \rangle \oplus 2v \oplus 3v \\ &= 2x\langle 0 \rangle \oplus x\langle 2 \rangle \oplus x\langle 3 \rangle \oplus 3x\langle 1 \rangle \oplus v. \end{aligned} \quad (14)$$

Therefore, when performing the XOR operations in the order of the coefficients a, b, c, d, may be equal to (2 1 1 3), respectively, the result of each XOR operation may be always masked. The orders (1 2 1 3), (3 1 1 2) and (1 3 1 2) may also maintain the masking after each XOR operation. In some implementations, the mask v applied to the input data may be kept in the output data of the operation performed by the circuit MXC.

In FIG. 12, the circuit XG2 may provide an output set PX6j[0 . . . MX,0 . . . BX] having the form of the output set PX5[0 . . . MX,0 . . . BX] (FIG. 7). The circuit XG5 may be connected in series and may be interposed between circuits XG2 and SBB. The circuit XG5 may receive the output set PX6j from the circuit XG2 and at another input the mask table W=U⊕V resulting from the combination of the tables U and V by XOR operations. Thus, each value W[m] in the table W may be equal to the XOR sum U[m]⊕V[m] of the values U[m] and V[m] selected at index m in the mask tables U and V. The table W can be computed as soon as the masks tables U and V are generated. By a suitable choice of the permutations U and V, each word column of the table W can include a same number of occurrences of all possible values of a word having the size of the words of the masks parameters U[m] and V[m].

According to an example embodiment, one or several pairs (U0, V0) of mask tables U0 and V0 may be stored in the circuit CT1, Each pair (U0, V0) may be tested as providing a table W including mask parameters W[m]=U0 [m]⊕V0[m]) and at least one word column including the same number of occurrences of all possible values of the words. The circuit CT1 may be configured to derive pairs of mask tables (U2, V2) as follows:

$$U2[m]=PM(U1[m]\oplus UR)\ V2[m]=PM(V1[m]\oplus VR),$$
for each index $m$, (15)

or $$U2[m]=PM(U1[m])\oplus UR\ V2[m]=PM(V1[m])\oplus VR,$$
for each index $m$, (16)

where UR and VR are random words of the size of any of the masks parameters U[m] or V[m], U1 and V1 are previously computed tables obtained by the equations (15) or (16), or equal to U0 and V0 respectively, and PM is a randomly selected permutation applied to the elements of the tables U1 and V1. It can be proved that each pair (U2, V2) computed using the equation (15) or (16) has a property of providing a table W including a word column including the same number of occurrences of all possible values of the words.

The circuit XG5 may provide an output set PX2j to the circuit SBB. The circuit XG5 can implement steps S51 to S58 illustrated in FIG. 15. The steps S51 to S58 may perform application of a mask table W[0 . . . MX] to an input set PX8[0 . . . MX,0 . . . BX], according to an example embodiment. Steps S51 to S57 may first be successively carried out. At step S51, the mask table W and a protected data having the form of the input set PX8 may be input. The input set PX8 may include words P8[0,0], . . . P8[MX,BX] and the mask table may include masks parameters W[0], . . . W[MX]. At step S52, a permutation PM in the form of a table may be randomly generated using the function RNP, the permutation PM including (MX+1)(BX+1) values between 0 and a maximum value KX=(MX+1)(BX+1)−1, where MX+1 is the number of values in the table PX8 and MX is the greatest value in this table. At step S53, an index k may be initialized to zero (0). At step S54, indexes m and b may be computed as in step S4. Step S55 may compute the output word P9[m,b] at indexes m and b in the output set PX9 by combining XOR operations the input word P8[m,b] at indexes m and b randomly selected in the input set PX8 with the mask parameter W[m] at index m randomly selected in the mask table W, using the random permutation PM (P9[m,b]=P8[m,b]⊕W[m]). At step S56, the index k may be incremented by one (1). At step S57, the index k may be compared with the maximum value KX. If the index k is greater than the value KX, step S58 may be carried out; otherwise steps S54 to S57 may be again carried out for a new iteration. At step S58, the output set PX9 may be completely defined and may be provided as output of steps S51 to S57.

Therefore, the output set PX2j provided by the circuit XG5 may include words P9[m,b] masked with the mask parameters W[m]=U[m]⊕V[m] (m=0, . . . MX). Since the data in the output set PX6j are already masked with the masks parameters V[m] applied by the circuit SBB, these masks may be removed by the circuit XG5. Thus, the data set PX2j may include data only masked by the mask parameters U[m], and thus, the data set PX2j may be ready to be further processed by the circuit SBB.

At a last round R, the circuit SBB may provide an output set PX3R[0 . . . MX,0 . . . BX] in which each element PX3R[m,b] may be masked by a mask V[m] of the mask table V. The circuit XG3 may apply the round key KT[R,0 . . . BX] to the output set PX4R according to the procedure of FIG. 7, and may provide an output set PX7R[0 . . . MX,0 . . . BX] in the form of a two-entry table in which each element at indexes m and b may be equal to CX1[b]⊕V[m] and may correspond to an input data X1[b] ⊕U[m] at the output of the circuit XG4. Therefore, the output data CX1[0 . . . BX] processed by each of the circuits OC1 can be deduced from each row m (=0, . . . MX) in the output set PX7R by applying the mask V[m] to the data PX7R[m, 0 . . . BX].

In some implementations, all the data processed by the processing chain including the circuits SBB, SHR, MXC, XG2, XG5 and XG3, may always be masked by either the parameter U or the parameter V. Thus, this processing chain forms a protected area in the circuit OC1. The circuit OC1 can be implemented by software with the same level of protection, since this protection depends on masking operations which can be implemented by either hardware or software without a reduction of the protection level. The circuit OC1 can be implemented either by software executed by the processor PRC or the co-processor CP1, or by hardware for example implemented in the co-processor CP1.

In some implementations, the circuit XG3 can be configured to output only the output data CX1.

In some implementations, the masks parameters U[m] can be added to the round key KT[0] instead of the input data X1. The mask parameters W[m] could also be added to the round keys KT[1] to KT[R−1], and the mask parameters V[m] could also be added to the round key KT[R]. Thus, a transformed round key table resulting from the above computations can be precomputed from the table KT, and the circuits XG4 and XG5 can be removed from the circuit OC1. Therefore, the protection method can be implemented in a circuit performing AES encryption or decryption without having to modify the circuit.

In some implementations, the circuit XG5 can be omitted, and a new masked substitution table SBM generated at each round according to the procedure of FIG. 10, using the mask table V as an input mask table U. Accordingly, only another output mask table V and a new permutation PM should be generated at step S32.

As an alternative of generating a permutation PM at each of the steps S12, S32, S42 and S52 in the circuit OC1, the permutation PM can be generated only once at each round performed by the circuit OC1, or only once in step S2 for the first round and at step S12 or S32 for the last round. Also in one or several of the steps S2, S12, S32, S42 and S52, the generation of the permutation PM can be replaced by the generation of two permutations, one being used for the index m or i, and the other for the index b or j.

The decryption operation according to AES algorithm includes substantially the same operations as the encryption operation. Therefore, the previously described method for protecting a sequence of operations can be applied to protect a program or a circuit implementing the AES decryption operation. More particularly, an AES decryption circuit includes circuits performing XOR operations with keys derived from the secret key SK, an inverse substitute calculation circuit, an inverse row-based circular permutation calculation circuit, an inverse column-based permutation calculation circuit, and/or the same key round table KT. The method previously disclosed can be applied to each operation performed by the decryption operation. The inverse column-based permutation calculation circuit also computes data having the following form:

$$ax<i>\oplus bx<i+1>\oplus cx<i+2>\oplus dx<i+3>,$$

where the group of coefficients (a, b, c, d) is equal to permutations of (9, 11, 13, 14). These coefficients allow the XOR operations to be computed in any order without removing the mask, and the resulting data keeps the same mask as the input data.

In some implementations, several words may be computed at a same time in a hardware architecture including wider buses than the size of the data to be processed by the operation, such as 32-bit or 64-bit since XOR operations are bitwise. In a 32-bit architecture, four bytes of the output data can be computed at the same time, and in a 64-bit architecture, eight bytes can be computed at the same time. Thus, in FIGS. 5, 7, 11 and 15, several iterations of a loop based on the index b can be grouped by processing several words in a same iteration. For example, in FIG. 5, several or all of the computations at step S5 for b=0 to BX can be performed in a single operation by concatenating the mask value U[m] with itself several times to form a word of the size of the data P2[m,0 . . . BX], as follows:

$$P2[m,0\ldots BX]=X2[0\ldots BX]\oplus U[m]//U[m]//\ldots //U[m], \quad (17)$$

"//" representing the concatenation operator of binary words.

Figure 15:
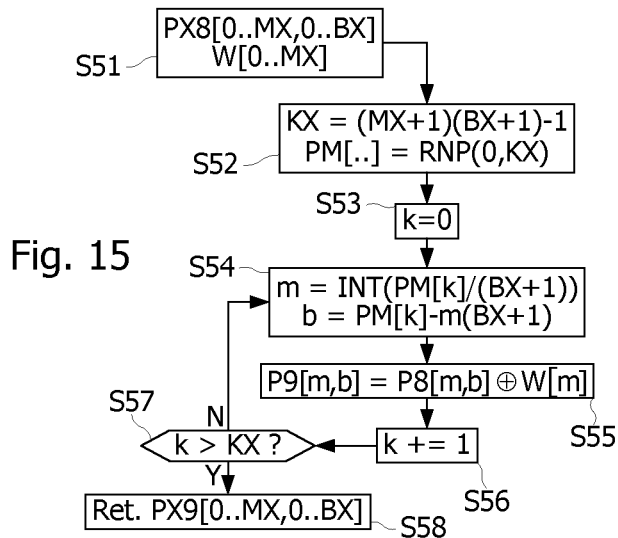
FIG. 15 is a flowchart of an XOR operation protected according to an example embodiment.

In a same way, the computations performed at step S55 in FIG. 15 can be performed as follows:

$$P9[m,0\ldots BX]=P8[m,0\ldots BX]\oplus U[m]//U[m]//\ldots //U[m], \quad (18)$$

In some implementations, if the circuit CT2 performing the AES operations undergoes an error such as one caused by a successful fault injection, the value of at least one word in the output set PX6R[0 . . . MX] may be changed. If only one word is changed, a word column m of the output set no longer may include all possible values of an output word and may include two identical words. The changed word may have necessarily the value of another word in the output set. Thus, such a fault injection can be detected by looking for two words in a column m of the output set having a same value. If two words are changed in a same column of the output, the fault injection would not be detected only when the values of these two words are swapped, which has a very low probability of occurrence. Using to the property of the XOR operation, an error can be easily detected by combining together by XOR operations all the words in each column m of the output set. The result of this combination may be equal to zero when the column m of the output set includes all possible values of an output word with a same number of occurrences.

It is noted that the protection method previously disclosed may be applied only to some operations performed in the AES algorithm which would be detected as vulnerable to side channel analyses. For example, the protection method previously disclosed can be applied only to the first and last rounds of the AES algorithm, from which sensitive data could leak, or only to the substitution operations.

More generally, the protection method previously disclosed can be applied to other encryption algorithms, implemented either by software or in hardware, and including XOR operations combining sensitive data, such as ARIA. ARIA algorithm may process 128-bit data divided in 16 bytes and may be performed by round. Each round may include a round key addition by XOR operations, a substitution step using two precomputed substitution tables and their inverses and a diffusion step. The substitution step processes byte per byte the input data combined with the round key, and the diffusion step may apply 16 different XOR combinations to the 16 bytes of the data provided by the substitution step. In each of these combinations, seven bytes of the data are added by XOR operations.

Figure 16:
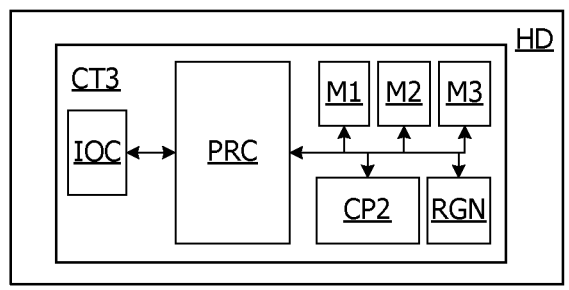
FIG. 16 illustrates a protection circuit, according to an example embodiment.

FIG. 16 illustrates an integrated circuit CT3 arranged on a portable medium HD such as, for example, a plastic card, and implementing one of the protection methods previously described, according to an example embodiment. The integrated circuit CT3 may include the same units as the integrated circuit CT described above in connection with FIG. 1, and differs from the latter in that the co-processor CP1 is replaced with a co-processor CP2 implementing one and/or the other protection methods described above, for example in the form of the circuit CT1 or CT2. Therefore, according to an example embodiment, the co-processor CP2 may be configured to provide output set of resulting data, rather than a single data of a cryptographic operation. Each output set may include the expected result of the cryptographic operation, wherein the output set may be such that all data in the output set have a same number of occurrences. The processor PRC can be configured to have access to the mask table V. Thus, the processor PRC can deduce the output data from the output set by combining any one of the data in the output set by one mask parameter in the mask table V. The selected data may have a same rank in the output set as the mask parameter selected in the mask table V.

The co-processor CP2 may also be configured to execute a part of the cryptographic operation. In this case, the processor PRC may be configured to produce output tables of resulting data including the result of the cryptographic operation. Each output table may be such that all data in it have a same number of occurrences.

The methods disclosed herein may also be implemented by software programs executable by a computer system. Further, implementations may include distributed processing and parallel processing, especially for processing in parallel several or all data in the input data sets and/or for providing in parallel several or all data in the output data sets.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for protecting execution by a circuit of a cryptographic operation against side channel analysis, the cryptographic operation providing an output data as a function of an input data including at least one word, the method comprising:
  applying the cryptographic operation to all data in an input set including data obtained by applying Exclusive OR (XOR) operations to the input data and to all first mask parameters in a first mask set including mask words forming the first mask parameters, each first mask parameter in the first mask set including at least one of the mask words in the first mask set, the mask words in the first mask set having a same size and forming at least one first word subset including a single word from each first mask parameter of the first mask set and a same number of occurrences of all possible values of the mask words in the first mask set; and
  providing as an output of the cryptographic operation, an output set including all data resulting from applying the cryptographic operation to all of the data in the input set, the output data of the cryptographic operation applied to the input data being obtained by applying XOR operations to any one of the data in the output set and to a respective second mask parameter in a second mask set including mask words forming the second mask parameters, each second mask parameter in the second mask set including at least one of the mask words in the second mask set, the mask words in the second mask set having a same size and forming at least one second word subset including a single word from each second mask parameter of the second mask set and a same number of occurrences of all possible values of the mask words in the second mask set.

2. The method of claim 1, wherein the first mask set is generated using a random permutation function.

3. The method of claim 1, wherein the cryptographic operation is a substitution operation in which the output data is selected in an input substitution table using the input data as an index, the method further comprising:
  using masked substitution tables generated from the input substitution table and including one masked substitution table for each of the first mask parameters in the first mask set; and
  for each first mask parameter in the first mask set, selecting one of the masked substitution tables corresponding to the first mask parameter, and selecting a first data in the selected masked substitution table, using, as an index, a second data corresponding to the first mask parameter in the input set, the output set including all the first data selected in one of the masked substitution tables.

4. The method of claim 3, wherein the masked substitution tables are generated by:
  generating the first mask set;
  generating the second mask set including a number of second mask parameters equal to a number of values in the input substitution table, each second mask parameter having a same number of occurrences in the second mask set;
  selecting once, each of the first and second mask parameter, respectively, in the first mark set and the second mask set to form mask pairs, each mask pair including one of the first mask parameters and one of the second mask parameters;
  generating, for each mask pair, one of the masked substitution tables, the generation of each of the masked substitution tables including:
    selecting each data in the input substitution table, and for each selected data:
    computing a masked data by applying the XOR operations to the selected data and to the second mask parameter of the mask pair corresponding to the masked substitution table,
    computing a masked index by applying the XOR operations to the first mask parameter of the mask pair corresponding to the masked substitution table and to an original index, and
    storing the masked data in the masked substitution table, the selected data being selected at the original index and the masked data being stored at the masked index, or the selected data being selected at the masked index and the masked data being stored at the original index.

5. The method of claim 4, wherein the generation of the second mask set includes one of the following operations:
  the second mask set is generated so that the first mask parameter and the second mask parameter of each mask pair are identical,
  the second mask set is deduced from the first mask set by applying a bijective function to the first mask set, and a shift function applied to ranks of the first mask parameters in the first mask set,
  the second mask set is deduced from the first mask set by applying a bijective function to the first mask set,
  the second mask set is generated using a random permutation function applied to the first mask set, and
  the second mask set is generated so that a combination by the XOR operations of each of the first mask parameters in the first mask set with a corresponding second mask parameter in the second mask set produces a third mask set including mask words forming the third mask parameters, each third mask parameter in the third mask set including at least one of the mask words in the third mask set, the mask words in the third mask set having a same size and forming at least one third word subset including a single word from each third mask parameter of the third mask set and a same number of occurrences of all possible values of the mask words in the third word subset.

6. The method of claim 4, wherein values in the masked substitution tables are determined in random order or stored in randomly selected positions in the masked substitution tables.

7. The method of claim 4, wherein the substitution operation is included in an operation for encrypting or decrypting the input data according to a cryptographic algorithm.

8. The method of claim 7, wherein the cryptographic algorithm conforms with an Advanced Encryption Standard (AES) algorithm, the method comprising:
  generating a round input set by applying the XOR operations to each word of the input data, to each mask parameter of the first mask set, and to a word of a secret key corresponding to one word of the at least one word of the input data;

performing several intermediate rounds, each intermediate round including:
  applying the substitution operation to each word in the round input set,
  computing a masked round output set for the intermediate round by applying the XOR operations to each word of a round output set for the intermediate round, to a respective mask parameter of the first mask set and to a respective mask parameter of the second mask set, and
  using the masked round output set as a round input set for a next round;

performing a last round including applying the substitution operation to each word in a round input set for the last round; and providing the output set in which each data is masked by a respective mask parameter of the second mask set.

9. The method of claim 8, wherein the first mask set and the second mask set are generated so that a third mask set resulting from a combination by the XOR operations of each mask parameter of the first mask set with a corresponding mask parameter of the second mask set includes only one occurrence of all possible values of a word of the input data.

10. The method of claim 9, further comprising generating a random permutation having a number of elements corresponding to a number of words in the input set, and applying one of the operations of the cryptographic algorithm to words of an operation input set in an order defined by the random permutation.

11. The method of claim 10, wherein the generating the random permutation is performed during at least one of:
  a first round of the cryptographic algorithm;
  at each round of the cryptographic algorithm;
  at a last round of the cryptographic algorithm; or
  before each operation of the cryptographic algorithm.

12. The method of claim 1, wherein computations of the data in the output set are performed in random order or stored in randomly selected positions in the output set.

13. The method of claim 1, further comprising detecting, in the output set, a computation error by at least one of:
  detecting two identical data in the output set; or
  applying XOR operations to each data in the output set and to a corresponding mask parameter in the first mask set or the second mask set, and searching results of the XOR operations for a data different from an expected output data.

14. A circuit, comprising
  a memory and a processor configured to:
  apply a cryptographic operation to all data in an input set including data obtained by applying Exclusive OR (XOR) operations to an input data and to all first mask parameters in a first mask set including mask words forming the first mask parameters, each first mask parameter in the first mask set including at least one of the mask words in the first mask set, the mask words in the first mask set having a same size and forming at least one first word subset including a single word from each first mask parameter of the first mask set and a same number of occurrences of all possible values of the mask words in the first mask set; and
  provide as an output of the cryptographic operation, an output set including all data resulting from an application of the cryptographic operation to all of the data in the input set, an output data of the cryptographic operation applied to the input data being obtained by applying XOR operations to any one of the data in the output set and to a respective second mask parameter in a second mask set including mask words forming the second mask parameters, each second mask parameter in the second mask set including at least one of the mask words in the second mask set, the mask words in the second mask set having a same size and forming at least one second word subset including a single word from each second mask parameter of the second mask set and a same number of occurrences of all possible values of the mask words in the second mask set.

15. The circuit of claim 14, comprising a co-processor.

16. The circuit of claim 14, wherein the first mask set is generated using a random permutation function.

17. The circuit of claim 14, wherein the cryptographic operation is a substitution operation in which the output data is selected in an input substitution table using the input data as an index, the circuit configured to:
  use masked substitution tables generated from the input substitution table and including one masked substitution table for each of the first mask parameters in the first mask set; and
  for each first mask parameter in the first mask set, select one of the masked substitution tables corresponding to the first mask parameter, and select a first data in the selected masked substitution table, using, as an index, a second data corresponding to the first mask parameter in the input set, the output set including all the first data selected in one of the masked substitution tables.

18. The circuit of claim 17, comprising one circuit performing a substitution operation for each masked substitution table.

19. The circuit of claim 18, wherein the masked substitution tables are generated by:
  generating the first mask set;
  generating the second mask set including a number of second mask parameters equal to a number of values in the input substitution table, each second mask parameter having a same number of occurrences in the second mask set;
  selecting once, each of the first and second mask parameter, respectively, in the first mask set and the second mask set to form mask pairs, each mask pair including one of the first mask parameters and one of the second mask parameters;
  generating, for each mask pair, one of the masked substitution tables, the generation of each of the masked substitution tables including:
    selecting each data in the input substitution table, and for each selected data:
    computing a masked data by applying the XOR operations to the selected data and to the second mask parameter of the mask pair,
    computing a masked index by applying the XOR operations to the first mask parameter of the mask pair corresponding to the masked substitution table and to an original index, and
    storing the masked data in the masked substitution table, the selected data being selected at the original index and the masked data being stored at the masked index, or the selected data being selected at the masked index and the masked data being stored at the original index.

20. The circuit of claim 19, wherein the generation of the second mask set includes one of the following operations:

the second mask set is generated so that the first mask parameter and the second mask parameter of each mask pair are identical, the second mask set is deduced from the first mask set by applying a bijective function to the first mask set, and a shift function applied to ranks of the first mask parameters in the first mask set, the second mask set is deduced from the first mask set by applying a bijective function to the first mask set, the second mask set is generated using a random permutation function applied to the first mask set, and the second mask set is generated so that a combination by the XOR operations of each of the first mask parameters in the first mask set with a corresponding second mask parameter in the second mask set produces a third mask set including mask words forming the third mask parameters, each third mask parameter in the third mask set including at least one of the mask words in the third mask set, the mask words in the third mask set having a same size and forming at least one third word subset including a single word from each third mask parameter of the third mask set and a same number of occurrences of all possible values of the mask words in the third word subset.

21. The circuit of claim 17, wherein values in the masked substitution tables are determined in random order or stored in randomly selected positions in the masked substitution tables.

22. The circuit of claim 17, wherein the circuit is configured to encrypt or decrypt the input data according to a cryptographic algorithm, the substitution operation being included in the cryptographic algorithm.

23. The circuit of claim 22, wherein the cryptographic algorithm conforms with an Advanced Encryption Standard (AES) algorithm, the circuit being configured to:
  generate a round input set by applying the XOR operations to each word of the input data, to each mask parameter of the first mask set, and to a word of a secret key corresponding to one word of the at least word of the input data;
  perform several intermediate rounds, each intermediate round including:
    applying the substitution operation to each word in the round input set,
    computing a masked round output set for the intermediate round by applying the XOR operations to each word of a round output set for the intermediate round, to a respective mask parameter of the first mask set and to a respective mask parameter of the second mask set, and
    using the masked round output set as a round input set for a next round;
  perform a last round including applying the substitution operation to each word in a round input set for the last round; and
  provide an output set in which each data is masked by a respective mask parameter of the second mask set.

24. The circuit of claim 23, wherein the first mask set and the second mask set are generated so that a third mask set resulting from a combination by the XOR operations of each mask parameter of the first mask set with a corresponding mask parameter of the second mask set includes only one occurrence of all possible values of a word of the input data.

25. The circuit of claim 24, further comprising generating a random permutation having a number of elements corresponding to a number of words in the input set, and applying one of the operations of the cryptographic algorithm to words of an operation input set in an order defined by the random permutation.

26. The circuit of claim 25, wherein the generating the random permutation is performed during at least one of:
  a first round of the cryptographic algorithm;
  at each round of the cryptographic algorithm;
  at a last round of the cryptographic algorithm; or
  before each operation of the cryptographic algorithm.

27. The circuit of claim 14, wherein computations of the data in the output set are performed in random order or stored in randomly selected positions in the output set.

28. The circuit of claim 14, further comprising detecting, in the output set, a computation error by at least one of:
  detecting two identical data in the output set; or
  applying XOR operations to each data in the output set and to a corresponding mask parameter in the first mask set or the second mask set, and searching results of the XOR operations for a data different from an expected output data.

29. A device comprising a circuit according to claim 14, arranged on a medium.

30. A non-transitory computer-readable storage device including code portions which, when carried out by a computer, configure the computer to carry out one or more instructions and cause one or more processors to:
  apply a cryptographic operation to all data in an input set including data obtained by applying Exclusive OR (XOR) operations to an input data and to all first mask parameters in a first mask set including mask words forming the first mask parameters, each first mask parameter in the first mask set including at least one of the mask words in the first mask set, the mask words in the first mask set having a same size and forming at least one first word subset including a single word from each first mask parameter of the first mask set and a same number of occurrences of all possible values of the mask words in the first mask set; and
  provide as an output of the cryptographic operation, an output set including all data resulting from an application of the cryptographic operation to all of the data in the input set, an output data of the cryptographic operation applied to the input data being obtained by applying XOR operations to any one of the data in the output set and to a respective second mask parameter in a second mask set including mask words forming the second mask parameters, each second mask parameter in the second mask set including at least one of the mask words in the second mask set, the mask words in the second mask set having a same size and forming at least one second word subset including a single word from each second mask parameter of the second mask set and a same number of occurrences of all possible values of the mask words in the second mask set.

* * * * *